UNITED STATES PATENT OFFICE.

HERMANN KIRCHHOFF, OF GEORGENTHAL, GERMANY.

PACKING FOR JOINTS.

SPECIFICATION forming part of Letters Patent No. 665,787, dated January 8, 1901.

Application filed July 7, 1900. Serial No. 22,870. (No specimens.)

*To all whom it may concern:*

Be it known that I, HERMANN KIRCHHOFF, manufacturer, a subject of the Duke of Saxe-Coburg-Gotha, residing at Georgenthal, in the Duchy of Saxe-Coburg-Gotha and German Empire, have invented certain new and useful Improvements in Packing for Joints, of which the following is a specification.

My invention concerns a material to serve as packing for steam, water, gas and oil machinery, and apparatus in place of rubber, asbestos, and the like. This packing material consists of rag or other fibers purified and freed from fat and which are impregnated with albumen obtained from eggs, blood-serum, fish, or the like, although vegetable albumen may be employed. In impregnating or soaking the fibrous material with albumen one has the option of either using the material thus obtained at once while yet in the pasty condition for packing joints or to press it in the form of sheets. This material inserted between the parts to be packed in the usual way will form an absolutely impermeable and exceedingly resisting packing, as under the influence of the heat to which the material is subjected in the machinery the albumen will render the fibers indissoluble and indisintegrable by any influences whatever, so that this packing will be suitable even for the highest working pressures.

Having now particularly described and ascertained the nature of my said invention and in what manner the same is to be performed, I declare that what I claim is—

1. A packing consisting of a fibrous material impregnated with albumen.
2. A packing consisting of rag impregnated with albumen.
3. A packing consisting of a fibrous material freed from fat and impregnated with albumen.
4. A packing consisting of rag freed from fat and impregnated with albumen.
5. A packing consisting of a fibrous material impregnated with albumen and pressed into sheets.
6. A packing consisting of rag and albumen pressed into sheets.
7. A packing consisting of albumen and a fibrous material freed from fat pressed into sheets.

In testimony whereof I have hereunto set my hand in presence of two subscribing witnesses.

HERMANN KIRCHHOFF.

Witnesses:
PAUL TEICHMANN,
FRANZ ROTTORF.